(12) United States Patent
Sato (10) Patent No.: US 7,375,756 B2
(45) Date of Patent: May 20, 2008

(54) BINOCULARS

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 678 days.

(21) Appl. No.: 10/940,742

(22) Filed: Sep. 15, 2004

(65) Prior Publication Data

US 2005/0062870 A1    Mar. 24, 2005

(30) Foreign Application Priority Data

Sep. 24, 2003  (JP) ............................ P2003-331699

(51) Int. Cl.
*H04N 7/18* (2006.01)
(52) U.S. Cl. ........................ 348/335; 396/432; 359/410; 359/412
(58) Field of Classification Search ........ 359/362–435; D16/135, 133; D3/267; 348/335, 157
See application file for complete search history.

(56) References Cited

U.S. PATENT DOCUMENTS

| | | | |
|---|---|---|---|
| 3,882,521 A * | 5/1975 | Johannsen | 396/432 |
| 6,088,053 A * | 7/2000 | Hammack et al. | 348/61 |
| 6,476,963 B1 * | 11/2002 | Chen | 359/412 |
| 6,542,295 B2 * | 4/2003 | Boys et al. | 359/410 |
| D502,481 S * | 3/2005 | Hines et al. | D16/208 |
| 7,178,997 B2 * | 2/2007 | Claudi et al. | 396/428 |
| 2001/0028498 A1 * | 10/2001 | Haga et al. | 359/407 |
| 2002/0069070 A1 * | 6/2002 | Boys et al. | 704/275 |
| 2003/0063189 A1 | 4/2003 | Hirunuma et al. | |
| 2003/0227543 A1 * | 12/2003 | Hammack et al. | 348/63 |

FOREIGN PATENT DOCUMENTS

| | | |
|---|---|---|
| JP | 10-98637 | 4/1998 |
| JP | 2001-281555 | 10/2001 |

\* cited by examiner

*Primary Examiner*—David Ometz
*Assistant Examiner*—Pritham Prabhakher
(74) *Attorney, Agent, or Firm*—Greenblum & Bernstein, P.L.C.

(57) ABSTRACT

Binoculars have a digital camera function. The binoculars comprise observation optical-systems, an imaging-block, an indicating-device, and an imaging-block direction changing device. The objective optical-systems have objective optical-systems having first- and second-light axes, at the front-face, and have ocular optical-systems at the rear-face. The imaging-block has an imaging-lens, and an imaging-device. The imaging-lens forms an image on an imaging-surface of the imaging-device, and has a third-light axis. The imaging-device captures the image formed on the imaging surface. The indicating-device has an indicating-surface on which images are indicated, and is located on one of the top- and bottom-face. The imaging-block direction changing device changes the direction of the imaging-block between a first position, where the third light-axis is parallel to the first- and second-light axes, and where the imaging-surface faces the front-face, and a second position, where the third light-axis is at a non-zero degree angle to the plane which includes the first- and second-axes.

9 Claims, 9 Drawing Sheets

Photographic subject

Operator

BINOCULARS

BACKGROUND OF THE INVENTION

1. Field of the Invention

The present invention relates to binoculars with a digital camera function, and in particular to stabilizing the binoculars, when the binoculars are being held and used as a digital camera.

2. Description of the Related Art

The binoculars with a digital camera function, are known as an optical apparatus which has a digital camera function. The binoculars with a digital camera function, indicate an image which is almost identical to the image which is observed by the operator's eyes through the ocular lenses, and store the image as a digital image.

Japanese unexamined patent publication (KOKAI) No. 2001-281555 discloses such binoculars.

SUMMARY OF THE INVENTION

However, the image is usually captured, while the operator holds the binoculars in a style that is consistent with that of conventional binoculars. Or, the release button is operated under the condition where the objective lenses 10R and 10L face the photographic subject, the ocular lenses 11R and 11L are close to the eyes of the operator, and the operator holds part of the bottom or side face and the top face of the binoculars at both sides of the binoculars, with both hands. In this holding style, it is easy to observe a photographic subject at a comparatively long-distance while looking through the ocular lenses. However, because both arms of the operator are spread when the image is being captured such as by pushing the release button, the possibility of camera-shake is high in comparison with holding a usual camera.

Therefore, an object of the present invention is to provide binoculars that can be held steady, so as to reduce camera-shake, when the binoculars are used as a digital camera.

According to the present invention, binoculars, with a front face, a rear face, side faces, a top face, and a bottom face, have a digital camera function.

The binoculars comprise a pair of observation optical systems which have a pair of objective optical systems having first and second light axes respectively, at the front face, and which have a pair of ocular optical systems at the rear face.

The binoculars comprise an imaging block which has an imaging lens, and an imaging device. The imaging lens forms an image on an imaging surface of the imaging device. The imaging lens has a third light axis. The imaging device captures the image formed on the imaging surface.

The binoculars comprise an indicating device that has an indicating surface on which images, imaged by the imaging device, are indicated, and which is located on one of the top and bottom face.

The binoculars comprise an imaging block direction changing device which changes the direction of the imaging block between a first position, where the third light axis is parallel to the first and second light axes, and where the imaging surface faces the front face, and a second position, where the third light axis is at a non-zero degree angle to the plane which includes the first and second axes.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings. First of all, a first embodiment is explained.

The binoculars 1 with a front face, a rear face, side faces, a top face, and a bottom face, comprise objective lenses 10R and 10L, which form the objective optical systems of a pair of observation optical systems, and are located at the front face of the binoculars 1. The right objective lens 10R has a first light axis XR, and the left objective lens 10L has a second light axis XL. The binoculars 1 comprise ocular lenses 11R and 11L, which form the ocular optical systems of the observation optical systems, and are located at the rear face of the binoculars 1. When the operator observes the photographic subjects by using the binoculars 1, the virtual images of the photographic subjects are observed through the objective lenses 10R and 10L, and the ocular lenses 11R and 11L.

The binoculars comprise a tele converter lens 32T in the front face side. The tele converter lens 32T has a fourth light axis XT. The fourth light axis XT is arranged between the first and second light axes XR and XL, so that an image, which is nearly equal to the images which are observed by the operator's eyes by using the observation optical systems, is imaged by a imaging block 21 which is described later. The magnification of the imaging optical system and the magnifications of the observation optical systems are made to correspond, when the fourth light axis XT agrees with the third light axis XM of the imaging lens 21L (which is described later), so that the tele converter lens 32T increases the focal length of the imaging optical system.

The binoculars 1 comprise an indicating device 12, such as an LCD, located at almost the center of the top face of the binoculars 1, which indicates images, imaged by the imaging optical system. The indicating device 12 is arranged on the top face of the binoculars 1 in such a manner that an indicating surface 12f of the indicating device 12 faces upward from the top face of the binoculars 1. The operator observes the indicating surface 12f from the side above the right and left ocular lenses 11R and 11L, or the operator can observe the indicating surface 12f in the horizontal direction, in such a manner that the objective lenses 10R and 10L face upward, and the ocular lenses 11R and 11L face downward (see FIG. 7).

The indicating device 12 indicates information data such as the date of imaging or number of images etc., in addition to the images which are imaged by the imaging block 21. The indicating device 12 can indicate the information data in a reversed and inverted condition where the direction is changed corresponding to the change in direction in which the binoculars are used.

Specifically, the indicating device 12 indicates the information data with correct orientation, so that a top side of the information data is closest to the front face on the indicating device 12 (or closest to the first horizontal line segment 12h1), when the imaging block 21 is in the first position, and the top side of the information data is closest to the rear face on the indicating device 12 (or closest to the second horizontal line segment 12h2), when the imaging block 21 is in the second position.

Figure 1:
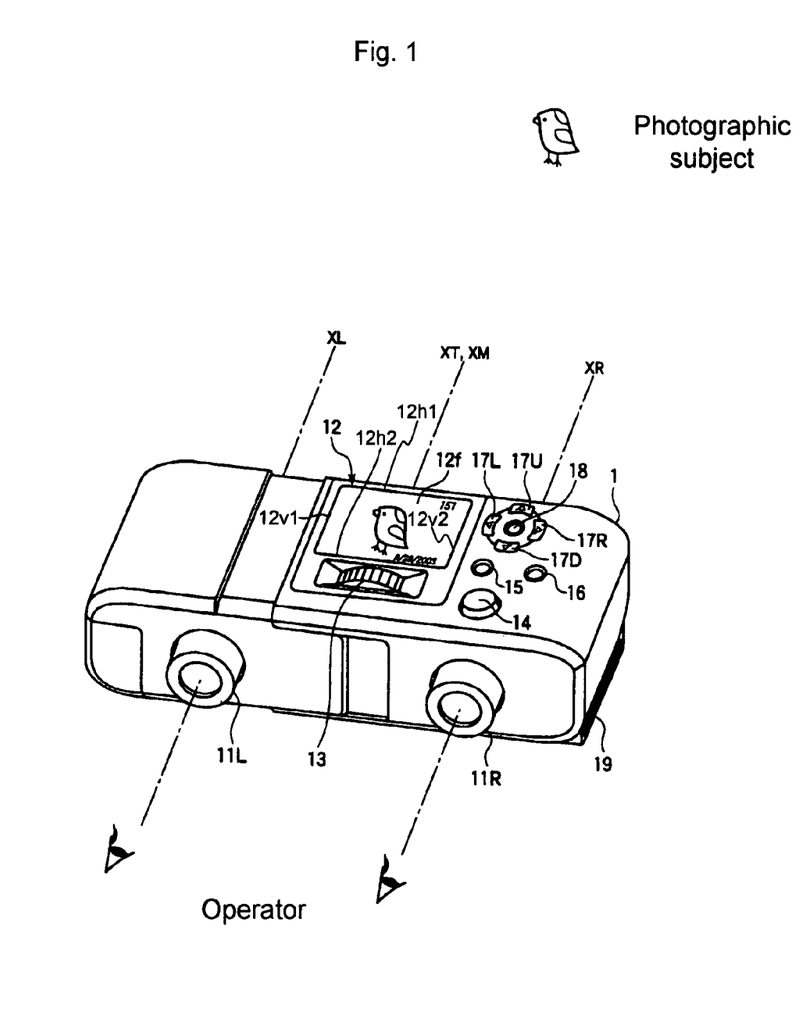
FIG. 1 is a perspective view showing binoculars with a digital camera function of the first embodiment, in the first use mode, viewed from the upper side of the ocular lenses of the observation optical system.

The binoculars 1 comprise a focusing dial 13 for the observation optical systems, located at the front of the indicating device 12 (in FIG. 1).

The indicating surface 12f is a rectangle that is enclosed by first and second horizontal line segments 12h1 and 12h2 and first and second vertical line segments 12v1 and 12v2. The first horizontal line segment 12h1 is located on the side of the LCD closest to the front face of the binoculars 1, the second horizontal line segment 12h2 is located on the side of the LCD closest to the rear face of the binoculars 1, and the first and second vertical line segments 12v1 and 12v2 are respectively located on the side of the LCD closest to the left side face and right side face of the binoculars 1, when viewed from the ocular side in FIG. 1. The first and second vertical line segments 12v1 and 12v2 are effectively parallel to the first and second light axes XR and XL.

The indicating device 12 is located on the top face of the binoculars 1, so that the indicating surface 12f is parallel or a little inclined to the plane which includes the first and second light axes XR and XL, as the eye line of the operator becomes effectively parallel to a perpendicular line from the indicating surface 12f, when the operator observes the top face of the binoculars 1 which includes the indicating surface 12f. In this embodiment, the indicating device 12 is located on the top face of the binoculars 1, which is described above, however the indicating device 12 may be located on the bottom face of the binoculars 1, under the condition where the indicating device 12 does not overlap with the imaging block 21.

The binoculars 1 comprise an imaging block 21 which has an imaging device 21S such as a CCD etc. and an imaging lens 21L, and which is located inside and at almost a center position of the bottom face of the binoculars 1. The imaging lens 21L forms an image on an imaging surface of the imaging device 21S. The imaging lens 21L has a third light axis XM. The imaging device 21S captures the image formed on the imaging surface of the imaging device 21S. The imaging block 21 has a rotating dial 21a, so that the imaging block 21 is rotated corresponding to the rotation of the rotating dial 21a. The rotating dial 21a is located on the plane which is perpendicular to the plane that includes the first and second light axes XR and XL, and rotates about an axis which is perpendicular to the first and second light axes XR and XL.

The imaging block 21 is arranged in a first or a second position, by being rotated using the rotating dial 21a, about the axis which is perpendicular to the first and second axes XR and XL. The first position is the position where the third light axis XM is parallel to the first and second axes XR and XL (see FIG. 4).

The second position is the position where the third light axis XM is at a non-zero degree angle to the plane which includes the first and second light axes XR and XL. It is desirable that the third light axis XM is exactly perpendicular to the plane which includes the first and second light axes XR and XL, in other words the non-zero degree angle is 90 degrees, when the imaging block 21 is in the second position (see FIG. 5). However, the third light axis XM may be effectively perpendicular to the plane which includes the first and second light axes XR and XL, under the condition where the imaging surface of the imaging device 21S faces downward of the bottom face of the binoculars 1.

When the imaging block 21 is in the first position, the third and fourth light axes XM and XT agree, so that the imaging optical system is composed of the tele converter lens 32T and the imaging lens 21. The focal length of the imaging optical system is lengthened by the tele converter lens 32T, and the imaging optical system forms the image on the imaging surface of the imaging device 21S with the same magnification as that of the observation optical systems.

Figure 2:
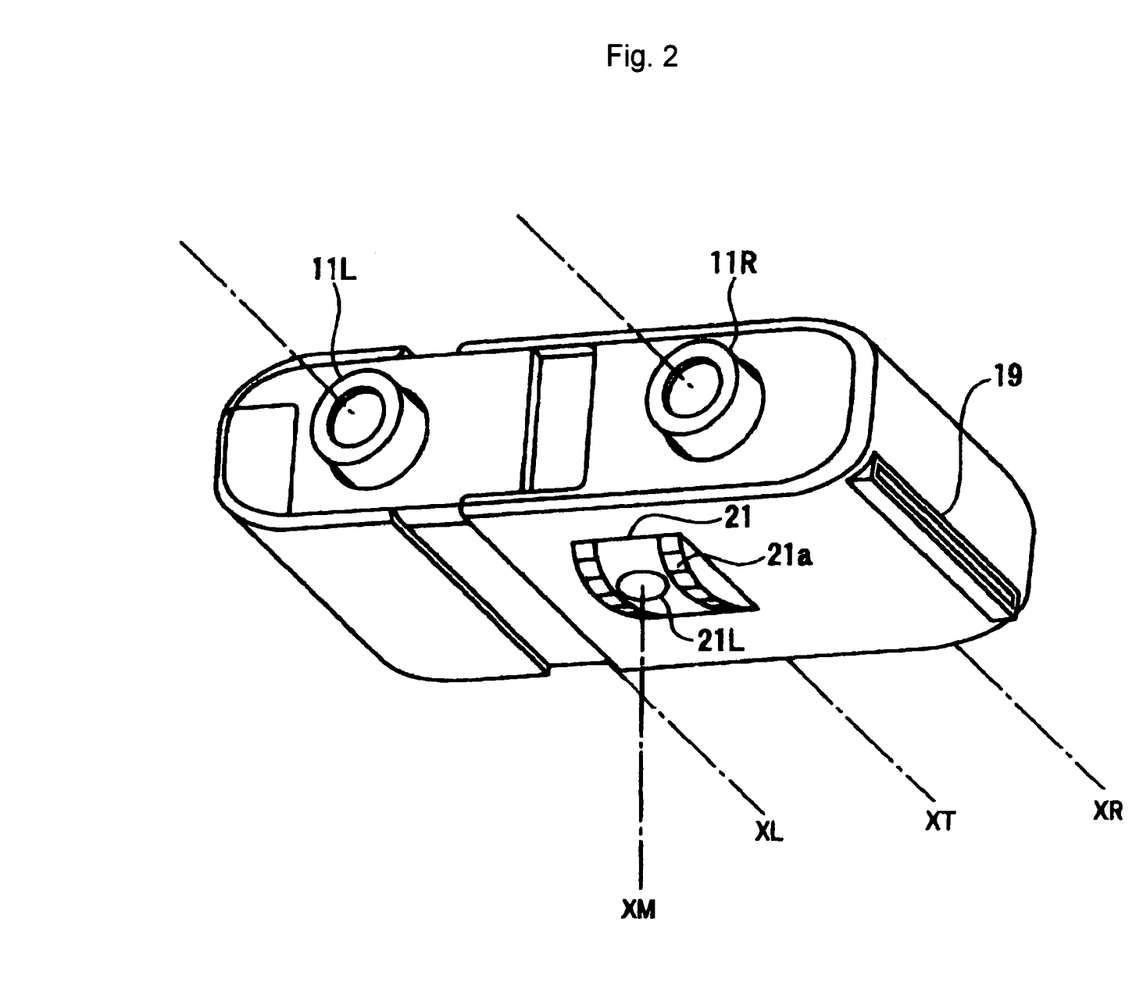
FIG. 2 is a perspective view of the binoculars of the first embodiment, viewed from the lower side of the ocular lenses of the observation optical system.
Figure 3:
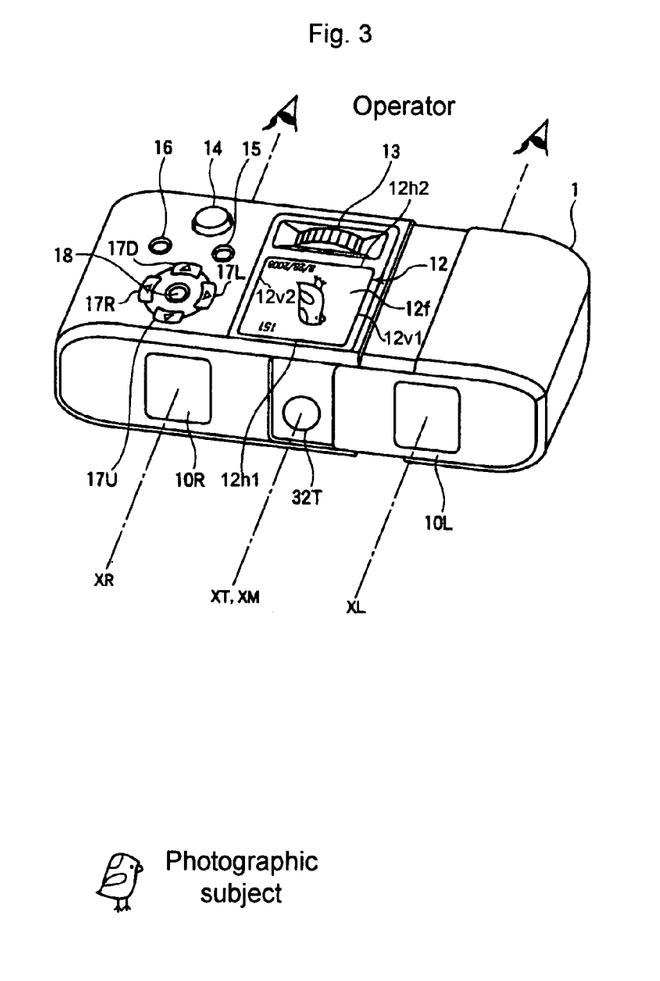
FIG. 3 is a perspective view of the binoculars of the first embodiment, viewed from the upper side of the objective lenses of the observation optical system.

When the imaging block 21 is in the second position, the photographic subject is imaged through the imaging lens 21L without being influenced by the tele converter lens 32T. FIG. 2 shows the condition where the imaging block 21 is in the second position.

In this embodiment, the imaging optical system is a pan-focus system.

Figure 4:
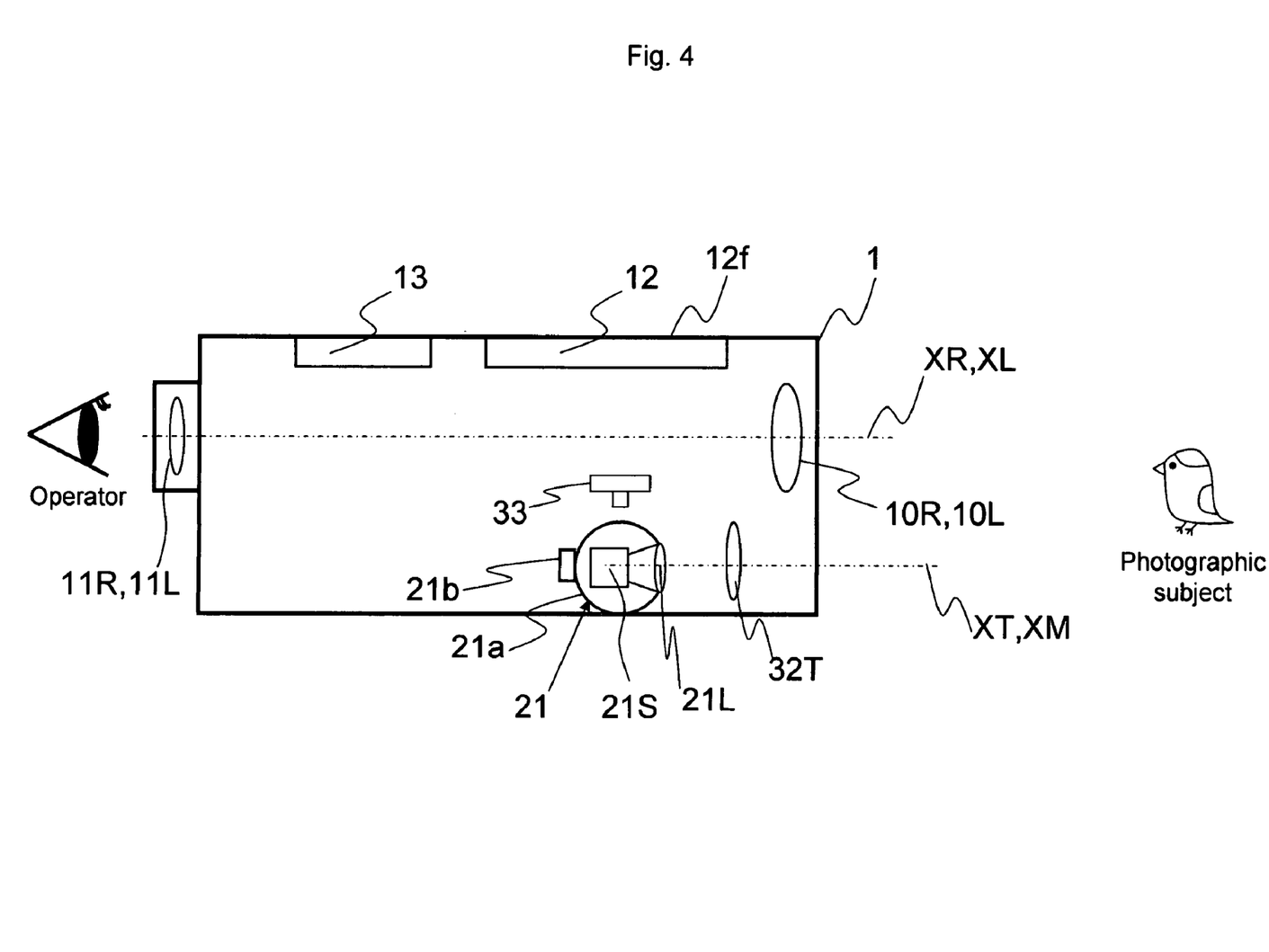
FIG. 4 is a block diagram of some of the features inside the binoculars when the imaging block is in the first position, in the first use mode.
Figure 5:
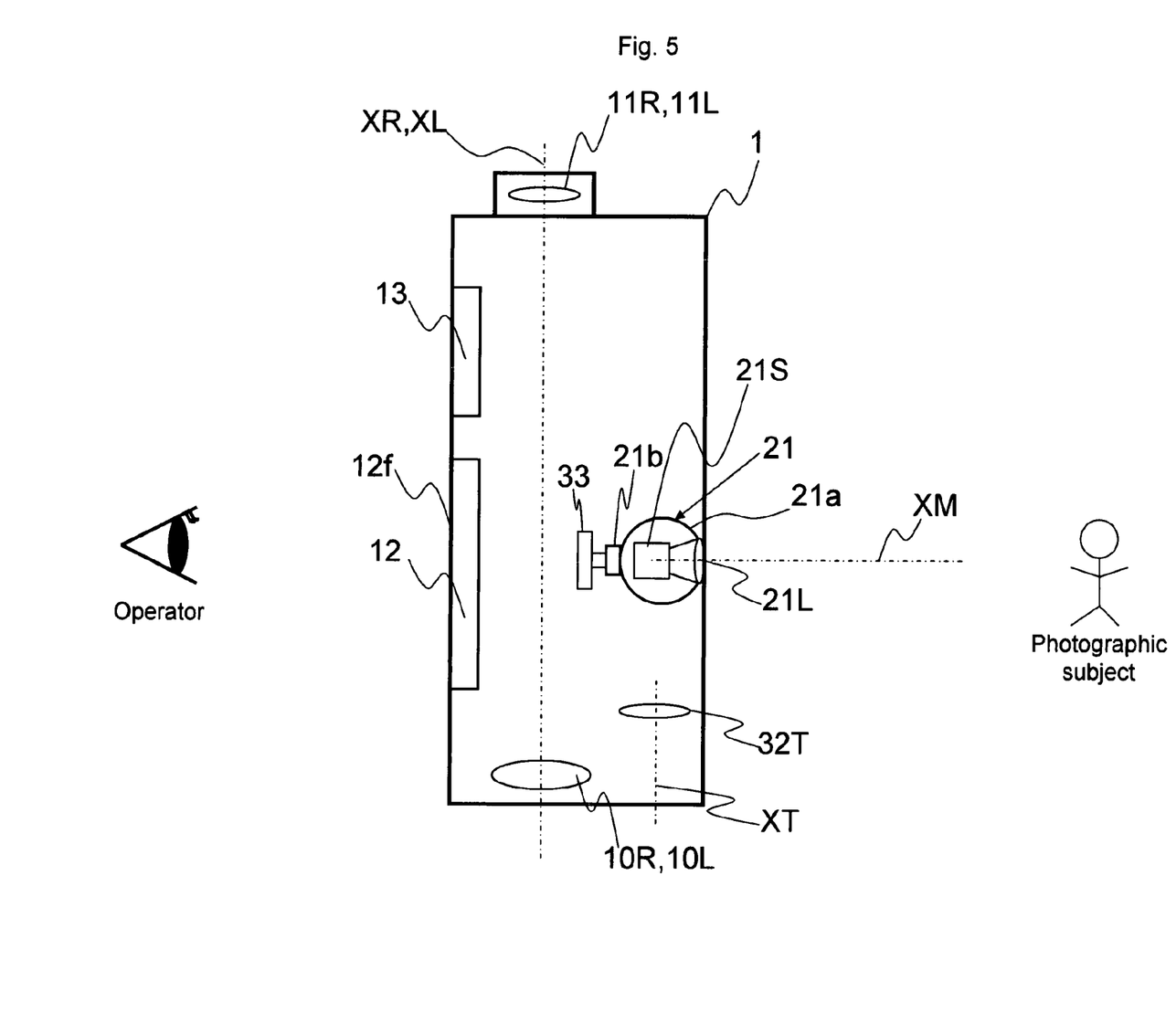
FIG. 5 is a block diagram of some of the features inside the binoculars when the imaging block is in the second position, in the second use mode.

The binoculars 1 comprise an imaging block direction detecting switch 33. The imaging block direction detecting switch 33 is used for judging whether the imaging block 21 is in the first or second position. This can be seen in FIGS. 4 and 5. FIG. 4 shows a block diagram of some of the features inside the binoculars 1 when the imaging block 21 is in the first position. FIG. 5 shows a block diagram of some of the features inside the binoculars 1 when the imaging block 21 is in the second position.

It is judged whether the imaging block 21 is in the first or second position, by whether or not the imaging block direction detecting switch 33 touches a contact point 21b which composes a part of the imaging block 21. As shown in FIG. 4, when the imaging block direction detecting switch 33 does not touch the contact point 21b, it is judged that the imaging block 21 is in the first position by the processor 23. As shown in FIG. 5, when the imaging block direction detecting switch 33 touches the contact point 21b, it is judged that the imaging block 21 is in the second position by the processor 23.

The binoculars 1 comprise a release button 14 on the top face, and at the right front side of the binoculars 1 viewed from the ocular lenses 11R and 11L. The release button 14 is located on the top face of the binoculars 1 (the surface which has the indicating device 12), and in the vicinity of the right ocular lens 11R.

The binoculars 1 comprise a menu key 15, a display button 16, four direction keys 17U, 17D, 17L, and 17R, and an OK key 18 on the top face, and at the rear side of the release button 14 viewed from the ocular lenses 11R and 11L (or close to the front face, or close to the objective lenses 10R and 10L). The direction keys 17U, 17D, 17L, and 17R respectively correspond to the up, down, left, and right directions. The OK key 18 is arranged at a location that is enclosed by the direction keys 17U, 17D, 17L, and 17R.

The binoculars 1 comprise a card slot 19 in one of the side faces of the binoculars 1. The card slot 19 is used for inserting a recording medium M such as a memory card etc.

Figure 6:
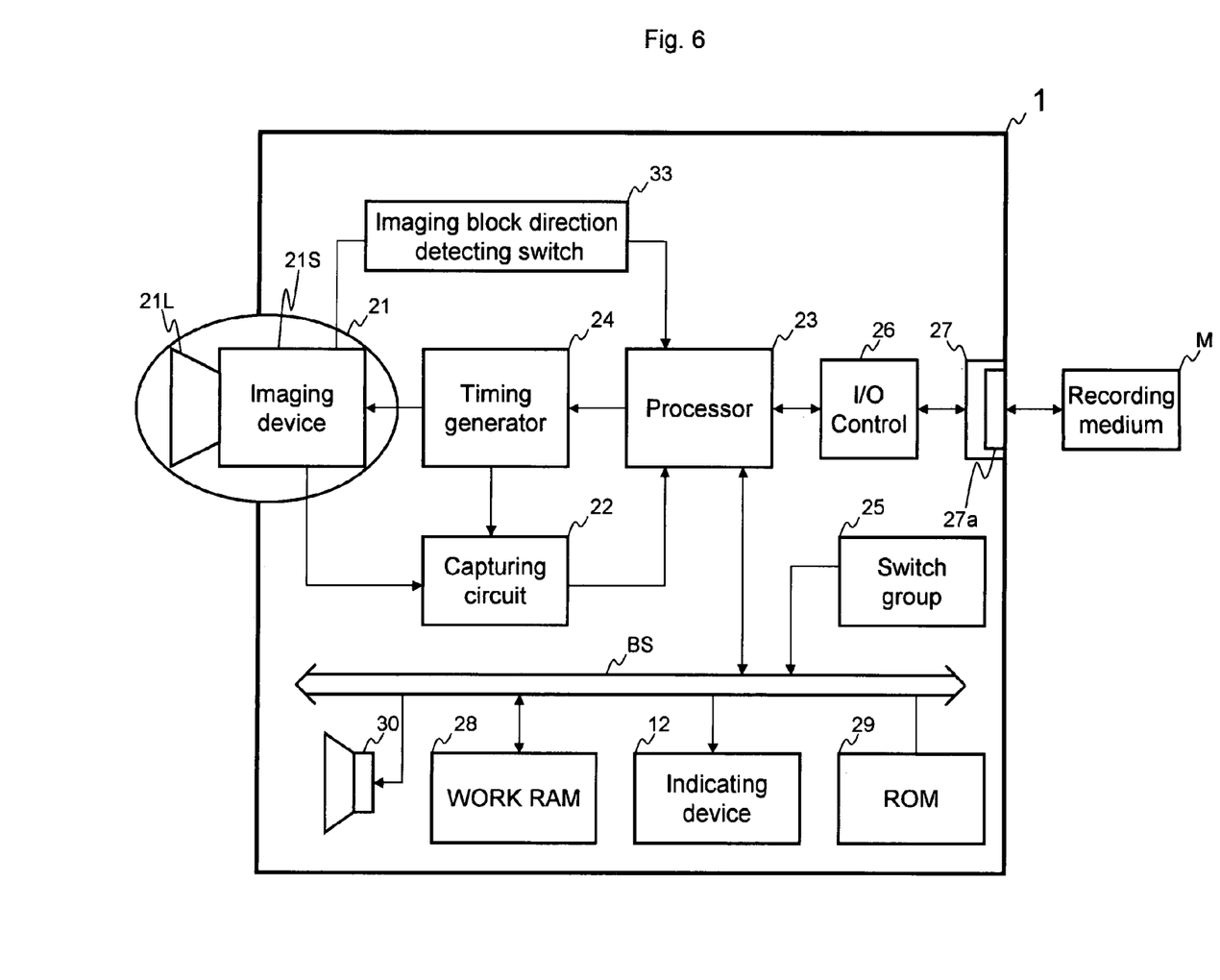
FIG. 6 is a circuit block diagram of the binoculars.

Next, the process by which a photographic subject, imaged by the imaging block 21, is indicated on the indicating device 12, is explained by using the circuit block diagram in FIG. 6.

The binoculars 1 comprise a capturing circuit 22, a processor 23, a timing generator 24, a switch group 25, and a speaker 30.

Light reflected from a photographic subject is guided to the imaging device 21S, through the imaging optical system, and is then converted to image signals. In the imaging block 21, specified signal processing such as the CCD processing is performed on the image signals, then the image signals are sent to the processor 23 through the capturing circuit 22.

The capturing circuit 22 is the circuit which temporarily stores the image signals (imaging data) from the imaging block 21 corresponding to the operation of the release button 14. For example, when an image, which is currently imaged by the imaging device 21S, is indicated by the indicating device 12 as a monitor image (or when the release button 14 is not operated), thinned out image signals are continuously output to the processor 23, and indicated by the indicating device 12 through the bus BS as a moving picture. When the release button 14 is operated, non-thinned out image signals are temporarily stored in the memory which is not depicted.

The image data which is temporarily stored in the capturing circuit 22, is indicated by the indicating device 12 through the processor 23 and the bus BS, as a still picture. The imaging block 21 and the capturing circuit 22 are controlled by synchronous signals from the timing generator 24, so that the timing generator 24 is controlled by the processor 23. The switch group 25, which includes the release button 14, and the speaker 30 are connected to the processor 23 through the bus BS etc.

The binoculars 1 comprise an I/O control circuit 26 and a recording medium control circuit 27. The I/O control circuit 26 is connected to the processor 23. The recording medium control circuit 27 is connected to the I/O control circuit 26. The recording medium control circuit 27 has a recording medium installing unit 27a to which the recording medium M, such as an IC memory card, is installed through the card slot 19.

The recording medium control circuit 27 monitors the memory capacity, the file layer, and the present free memory of the recording medium M, so that reading and writing of data are carried out by the recording medium control circuit 27.

For example, the image data which is imaged and temporarily stored in the capturing circuit 22, is written in an unused area of the recording medium M through the processor 23, the I/O control circuit 26, and the recording medium control circuit 27. In the second use mode which is described later, the writing of the image data in the recording medium M is carried out under the condition that the image is inverted and reversed.

The binoculars 1 comprise a WORKRAM 28 and a ROM 29. For example, the image data which is stored in the recording medium M can be sent to the WORKRAM 28 through the recording medium control circuit 27, the I/O control circuit 26, the processor 23, and the bus BS. The processor 23 is driven in accordance with the system programs that were stored in the ROM 29.

The binoculars 1 can image the photographic subject using either of two use modes by rotating the rotation dial 21a. The first use mode is where the imaging block 21 is in the first position, and the second use mode is where the imaging block 21 is in the second position.

In the first use mode, the operator carries out the imaging of the photographic subject, while observing the photographic subject through the objective lenses 10R and 10L and the ocular lenses 11R and 11L (see FIG. 1). This is the same as using usual binoculars where the top face of the binoculars (the surface which has the indicating device 12) is set upward, the objective lenses 10R and 10L face the photographic subject, and the ocular lenses 11R and 11L are close to the eyes of the operator. The operator uses the binoculars 1 while holding part of the bottom or side face and the top face of the binoculars 1 with both hands or one hand. The operator operates the release button 14 with his right hand, typically with his forefinger.

Because the focal length of the imaging optical system which includes both of the imaging lens 21L and the tele converter lens 32T, is the same as the focal lengths of the observation optical systems, the imaging block 21 can image a photographic subject in almost the same way as the subject appears to the operator's eyes through the observation optical systems.

Because the imaging optical system is a pan-focus system, a focusing operation is not needed for the imaging optical system. Because the digital image which is obtained from the imaging is indicated by the indicating device 12, the operator can confirm the image after imaging.

The first use mode is suited to a scene where the photographic subject is located a long-distance away, and is imaged while observing the photographic subject at a long-distance as if one were using usual binoculars. The holding of the binoculars 1 can be carried out, like usual binoculars, furthermore, the release button 14 can be operated while maintaining the usual holding condition. However, the possibility of camera-shake is high, similar to conventional binoculars having a digital camera function.

Figure 7:
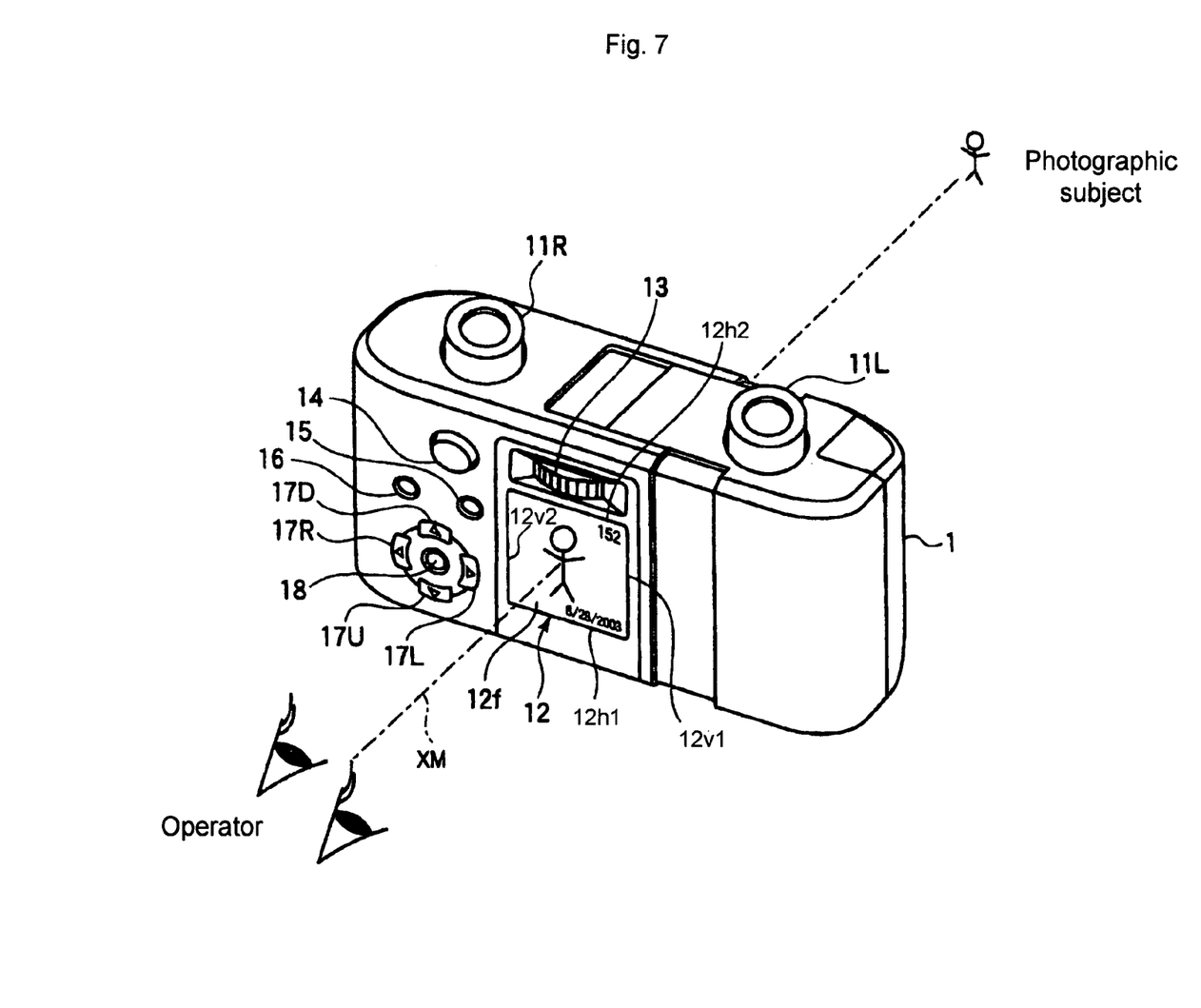
FIG. 7 is a perspective view which shows the binoculars of the first embodiment, in the second use mode, viewed from the upper side of ocular lenses of the observation optical system.

In the second use mode, the operator carries out the imaging of the photographic subject, while observing the photographic subject through the imaging block 21, and the indicating device 12 (see FIG. 7). In this case, the observation optical systems, such as the objective lenses 11R and 11L etc. are not used, so that the observing and the imaging are carried out by using only the imaging optical system, such as the imaging block 21 etc. As is similar to using a usual digital camera, when the rear face of the binoculars 1 (the surface which has the ocular lenses 11R and 11L) faces upward, the imaging lens 21L which is on the bottom face of the binoculars 1 (the opposite side to the surface which has the indicating device 12) faces the photographic subject, and the indicating device 12 faces the operator, the operator uses the binoculars 1 while holding part of the bottom or side face and the top face of the binoculars 1 or the front face of the binoculars 1 (the surface which has the objective lenses 10R and 10L), with both hands or one hand. The operator operates the release button 14 with his left hand, especially with his thumb.

The second use mode is suited to a scene where the photographic subject is located at a comparatively short-distance. The photographic subject is imaged while observing it at a comparatively short-distance, like one would when using a usual digital camera. Because the binoculars 1 can be held, like a usual digital camera, the possibility of camera-shake is low.

The tele converter lens 32T is arranged where the fourth light axis XT is parallel to the first and second axes XR and XL. In the second use mode, the third light axis XM deviates from the fourth light axis XT by rotating the imaging block 21, so that the imaging optical system includes only the imaging lens 21L without the tele converter lens 32T. Accordingly, a changing mechanism like this does not increase the thickness of the binoculars 1.

In the second use mode, the control of the indicating device 12 for indicating images which have been imaged, is performed in the same way as that in the first use mode, however, the control of the indicating device 12 for indicating information data such as the date of imaging or number of images etc., is performed differently to that in the first use mode, such as in the inverted condition where the information character is inverted and reversed.

In the second use mode, when the image data is stored in the recording medium M, the processor 23 alters the arrangement direction of the image data which is temporarily stored in the capturing circuit 22, so that the processor 23 stores the image data which is inverted and reversed, in the recording medium M, through the recording medium control circuit 27, as the image data. The processor 23 judges whether or not the image data should be reversed in the storing process, based on the contact condition of the imaging block direction detecting switch 33 and the contact point 21b.

Next, the second embodiment is explained. In the first embodiment, the binoculars 1 comprise the tele converter lens 32T whose light axis, which is the fourth light axis XT, agrees with the third light axis XM of the imaging lens 21L in the first use mode. However, in the second embodiment, the binoculars 1 do not comprise the tele converter lens 32T, but comprise a wide angle converter lens 32W whose light axis, which is a fifth light axis XW, agrees with the third light axis XM of the imaging lens 21L in the second use mode. Other constitutions are the same as those in the first embodiment.

Figure 8:
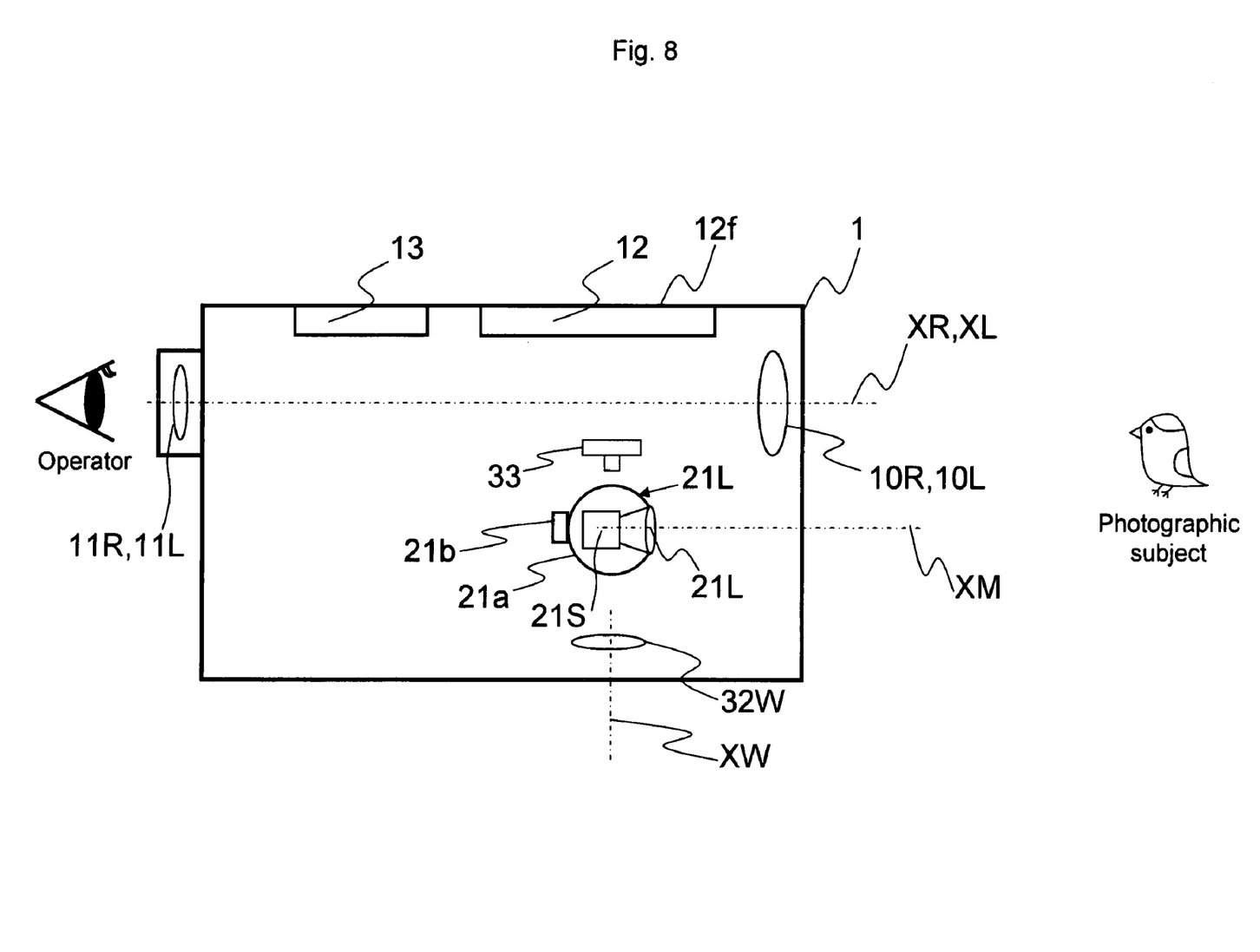
FIG. 8 is a block diagram of some of the features inside the binoculars of the second embodiment, when the imaging block is in the first position, in the first use mode.
Figure 9:
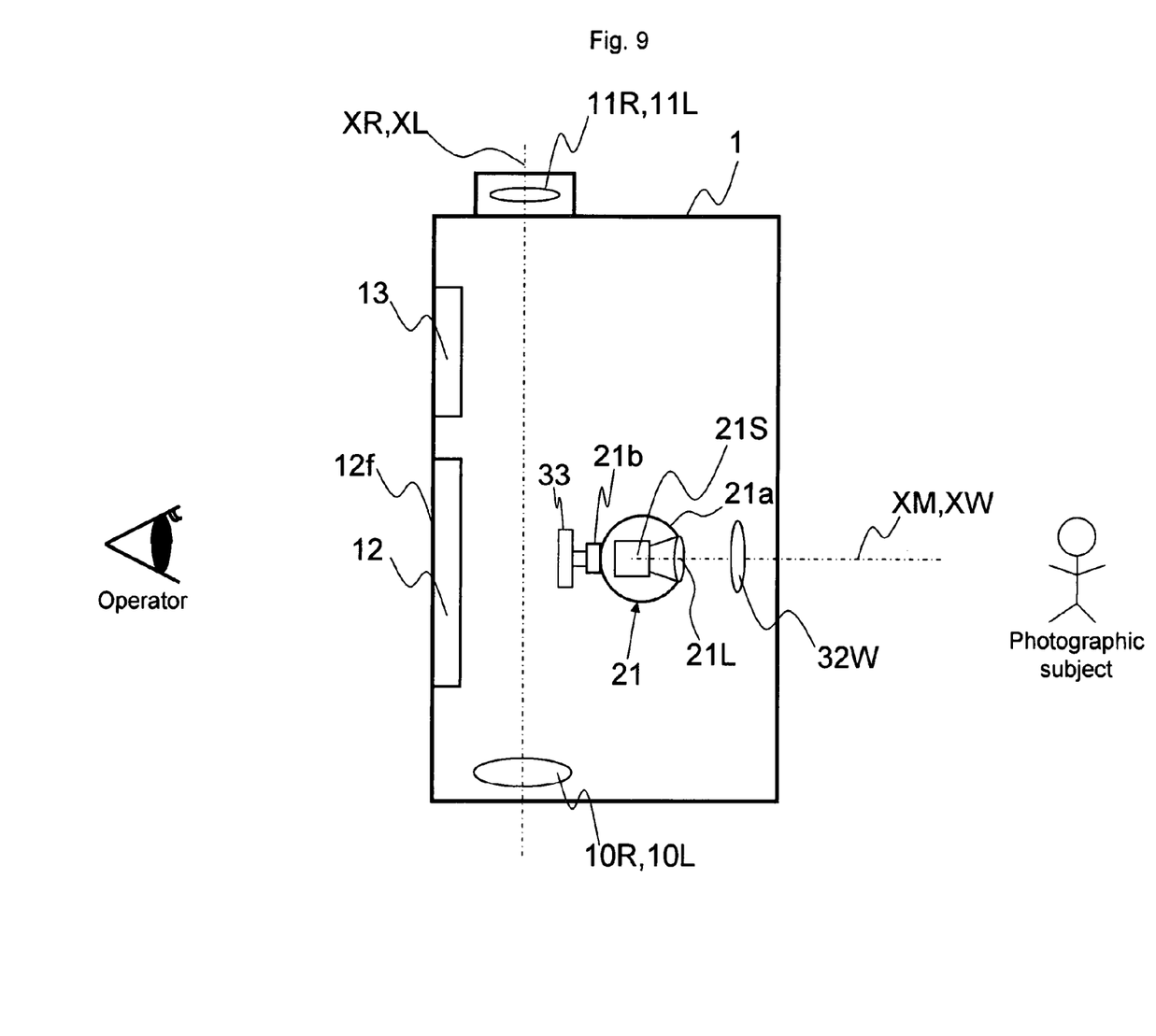
FIG. 9 is a block diagram of some of the features inside the binoculars of the second embodiment, when the imaging block is in the second position, in the second use mode.

FIG. 8 shows a block diagram of some of the features inside the binoculars 1 of the second embodiment when the imaging block 21 is in the first position, in the first use mode. FIG. 9 shows a block diagram of some of the features inside the binoculars 1 of the second embodiment when the imaging block 21 is in the second position, in the second use mode.

When the imaging block 21 is in the second position, the third and fifth light axes XM and XW agree, so that the imaging optical system is composed of the wide angle converter lens 32W and the imaging lens 21, and the focal length of the imaging optical system is shortened by the wide angle converter lens 32W, and the imaging angle of view is enlarged such as is suitable for the use as a usual digital camera.

The wide angle converter lens 32W is arranged on the fifth light axis XW which is perpendicular to the plane which includes the first and second light axes XR and XL. In the first use mode, the third light axis XM deviates from the fifth light axis XW by rotating the imaging block 21, so that the imaging optical system includes only the imaging lens 21L without being influenced by the wide angle converter lens 32W.

In the first and second embodiments, the tele converter lens 32T and the wide angle converter lens 32W are fixed in the binoculars 1, so that only the imaging block 21 is rotated, however the tele converter lens 32T and the wide angle converter lens 32W may be rotated with the imaging block 21.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-331699 (filed on Sep. 24, 2003), which is expressly incorporated herein by reference, in its entirety.

The invention claimed is:

1. Binoculars with a front face, a rear face, side faces, a top face, and a bottom face, said binoculars having a digital camera function and comprising:

a pair of observation optical systems which have a pair of objective optical systems having first and second light axes respectively, at said front face, and which have a pair of ocular optical systems at said rear face;

an imaging block which has an imaging lens, and an imaging device, said imaging lens forming an image on an imaging surface of said imaging device, said imaging lens having a third light axis, and said imaging device capturing said image formed on said imaging surface;

an indicating device that has an indicating surface on which images, imaged by said imaging device, are indicated, and which is located on one of said top and bottom face;

an imaging block direction changing device which changes the direction of said imaging block between a first position, where said third light axis is parallel to said first and second light axes, and where said imaging surface faces said front face, and a second position, where said third light axis is at a non-zero degree angle to the plane which includes said first and second axes; and a wide angle converter lens whose light axis agrees with said third light axis in said second position, an optical image, which is formed from light that has passed through said wide angle converter lens and said imaging lens, being formed on said imaging surface, when said imaging block is in said second position.

2. The binoculars according to claim 1, wherein said indicating device is located on one of said top face and said bottom face, and said indicating surface is parallel or inclined to a plane which includes said first and second light axes.

3. The binoculars according to claim 1, wherein said non-zero degree angle is 90 degrees.

4. The binoculars according to claim 1, wherein said imaging surface faces said bottom face, when said imaging block is in said second position.

5. The binoculars according to claim 1, wherein said imaging block direction changing device has a rotating dial which rotates said imaging block in order to be located at one of said first and second positions.

6. The binoculars according to claim 1, further comprising a release button which is used for capturing a still image by said imaging block;

said release button being located at said top face, in the vicinity of a right ocular lens of said ocular optical systems.

7. Binoculars with a front face, a rear face, side faces, a top face, and a bottom face, said binoculars having a digital camera function and comprising:

a pair of observation optical systems which have a pair of objective optical systems having first and second light axes respectively, at said front face, and which have a pair of ocular optical systems at said rear face;

an imaging block which has an imaging lens, and an imaging device, said imaging lens forming an image on an imaging surface of said imaging device, said imaging lens having a third light axis, and said imaging device capturing said image formed on said imaging surface, said imaging block being rotated between a first position, where said third light axis is parallel to said first and second light axes, and where said imaging surface faces said front face, and a second position, where said third light axis is at a non-zero degree angle to the plane which includes said first and second axes; and a wide angle converter lens whose light axis agrees with said third light axis in said second position, an optical image, which is formed from light that has passed through said wide angle converter lens and said imaging lens, being formed on said imaging surface, when said imaging block is in said second position.

8. Binoculars with a front face, a rear face, side faces, a top face, and a bottom face, said binoculars having a digital camera function and comprising:

a pair of observation optical systems which have a pair of objective optical systems having first and second light axes respectively, at said front face, and which have a pair of ocular optical systems at said rear face;

an imaging block which has an imaging lens, and an imaging device, said imaging lens forming an image on an imaging surface of said imaging device, said imaging lens having a third light axis, and said imaging device capturing said image formed on said imaging surface;

an indicating device that has an indicating surface on which images, imaged by said imaging device, are indicated, and which is located on one of said top and bottom face;

an imaging block direction changing device which changes the direction of said imaging block between a first position, where said third light axis is parallel to said first and second light axes, and where said imaging surface faces said front face, and a second position, where said third light axis is at a non-zero degree angle to the plane which includes said first and second axes, said imaging block direction changing device having an imaging block direction detecting switch which detects that at least one part of said imaging block is in said first position; and an image data storing device that stores image data which is inverted and reversed, and which is obtained from said imaging optical system, when said imaging block is in said second position.

9. Binoculars with a front face, a rear face, side faces, a top face, and a bottom face, said binoculars having a digital camera function and comprising:

a pair of observation optical systems which have a pair of objective optical systems having first and second light axes respectively, at said front face, and which have a pair of ocular optical systems at said rear face;

an imaging block which has an imaging lens, and an imaging device, said imaging lens forming an image on an imaging surface of said imaging device, said imaging lens having a third light axis, and said imaging device capturing said image formed on said imaging surface;

an indicating device that has an indicating surface on which images, imaged by said imaging device, are indicated, and which is located on one of said top and bottom face; and an imaging block direction changing device which changes the direction of said imaging block between a first position, where said third light axis is parallel to said first and second light axes, and where said imaging surface faces said front face, and a second position, where said third light axis is at a non-zero degree angle to the plane which includes said first and second axes, wherein said indicating device indicates information data such as date of imaging etc. with correct orientation, so that a top side of said information data is closest to said front face on said indicating device, when said imaging block is in said first position, and said top side of said information data is closest to said rear face on said indicating device, when said imaging block is in said second position.

* * * * *